United States Patent Office 3,069,326
Patented Dec. 18, 1962

3,069,326
METHOD OF PREPARING 6-AMINO-5-HYDROXY-1,3-CYCLOHEXADIENE-1-CARBOXYLIC ACID
Jerry Robert Daniel McCormick, New City, N.Y., Newell Oscar Sjolander, Saddle River, N.J., and Ursula Hirsch and Jules Reichenthal, Pearl River, N.Y., assignors to American Cyanamid Company, New York, N.Y., a corporation of Maine
No Drawing. Filed Oct. 31, 1961, Ser. No. 148,820
2 Claims. (Cl. 195—36)

This invention relates to the preparation of 6-amino-5-hydroxy-1,3-cyclohexadiene-1-carboxylic acid of the formula:

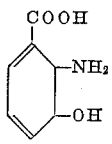

The above compound is a useful intermediate for the preparation of various benzoic acid derivatives such as, for example, anthranilic acid, 2-amino-3-hydroxy benzoic acid, and the like. The novel compound may be converted to anthranilic acid simply by heating in concentrated hydrochloric acid. As is well known, anthranilic acid is a valuable intermediate used in the preparation of indigo. The novel compound may also be converted to 2-amino-3-hydroxybenzoic acid by dehydrogenation in boiling water over a palladium catalyst. 2-amino-3-hydroxybenzoic acid is a biologically active nicotinic acid precursor [J.A.C.S. 70, 1847 (1948)].

The novel compound is produced by aerobically fermenting an aqueous nutrient medium with certain mutant strains of microorganisms of the species *Streptomyces aureofaciens*. A particularly preferred method involves the use of a new strain of *S. aureofaciens* which we have designated as S652, but as will be apparent from the detailed description hereinafter certain other strains of *S. aureofaciens* may also be used to produce this compound with varying degrees of effectiveness.

The new strain is a member of the species *S. aureofaciens* since it is a direct descendant of the chlortetracycline-producing strain of *S. aureofaciens*, A377, which was isolated from the soil and is described in the United States patent to Duggar No. 2,482,055, and which is deposited at the Northern Regional Research Laboratories, Peoria, Illinois, as NRRL 2209. Mutagenic agents and selective agents used in obtaining this new strain include ultraviolet irradiation, nicotine and nitrogen mustard treatments, and phage exposure. Spontaneous mutation of chlortetracycline-producing strains of *S. aureofaciens* may also result in strains which will produce the new compound of this invention.

The new strain of *S. aureofaciens* possesses the same general characteristics as do the strains which produce the tetracyclines and differs in the same general manner that the tetracycline-producing and chlortetracycline-producing strains of *S. aureofaciens* differ from each other, as has been described in a number of scientific papers which have been published. The data appearing below will serve to illustrate the variation of Strain S652 from the original A377 strain available as NRRL 2209.

*Streptomyces aureofaciens* Strain S652 was differentiated from *Streptomyces aureofaciens* Strain A377 (NRRL 2209) by observation of growth characteristics on various media incubated at 26.5° C.

(1) GLYCEROL ASPARAGINE BEEF EXTRACT AGAR

| | Percent |
|---|---|
| Glycerol | 1.0 |
| L-asparagine | 0.05 |
| Beef extract | 0.2 |
| $KH_2PO_4$ | 0.05 |
| Bacto agar | 1.5 |

Distilled water, q.s. 100.0 percent.
Adjustment with 50% KOH to pH 7.0.
Post sterilization, pH 7.2.

| | Streptomyces aureofaciens | |
|---|---|---|
| | Strain S652 | Strain A377 |
| Growth | Good to abundant, hyaline, white to apigmentous. | Good. |
| Aerial hyphae | Abundant | Slight to fair, white to light gray. |
| Sporulation | Abundant, fawn [1] to beaver.[1] | Light gray. |
| Diffusible pigment | Light olive yellow | Light yellow. |
| Reverse | White, hyaline | Yellow to light orange-yellow. |

[1] Color Harmony Manual, third edition, Container Corporation of America.

(2) DEXTRIN CZAPEK-DOX AGAR

| | Percent |
|---|---|
| Dextrin | 1.0 |
| $NaNO_3$ | 0.2 |
| $K_2HPO_4$ | 0.1 |
| $MgSO_4.7H_2O$ | 0.05 |
| KCl | 0.05 |
| $FeSO_4.7H_2O$ | 0.001 |
| Bacto agar | 1.5 |

Distilled water, q.s. 100.0 percent.
Post sterilization, pH 7.2.

| | Streptomyces aureofaciens | |
|---|---|---|
| | Strain S652 | Strain A377 |
| Growth | Thin, entire, semi-opaque, white. | Good. |
| Aerial hyphae | Trace, white | Abundant, mouse gray [1] to lead gray [1] water-white surface globules. |
| Sporulation | None | Profuse. |
| Diffusible pigment | do | Trace, pale yellow. |
| Reverse | White | Apigmentous, pink trace. |

[1] Color Harmony Manual, third edition, Container Corporation of America.

(3) AP4 CORN STEEP AGAR

| | Percent |
|---|---|
| Corn steep | 0.4 |
| Sucrose | 1.0 |
| $MgSO_4 7H_2O$ | 0.025 |
| $KH_2PO_4$ | 0.2 |
| $(NH_4)_2HPO_4$ | 0.2 |
| Bacto agar | 2.0 |

Tap water, q.s. 100.0 percent.
Post sterilization, pH 6.5.

(4) OTHER MEDIA

| Medium | Streptomyces aureofaciens | |
|---|---|---|
| | Strain S652 | Strain A377 |
| Nutrient agar | Sparse growth; hyaline to semiopaque white. No aerial hyphae. Reverse: White. No soluble pigment. | Good growth. No aerial hyphae. Reverse: pale yellow. Pale yellow soluble pigment. |
| Glucose asparagine meat extract agar. | Fair growth: white. Sparse aerial mycelium: White becoming brown to rose taupe.[1] Reverse: white. Light yellow soluble pigment. Sporulation: sparse. | Good growth. Aerial hyphae white becoming increasingly gray with increase with spore formation. Reverse: light yellow to pink-orange. Trace: yellow-orange soluble pigment. |
| Waksman's agar | Fair to good growth: Chartreuse tint.[1] Aerial mycelium: sparse to abundant fawn.[1] Sporulation: sparse to abundant. Reverse: Hyaline chartreuse tint.[1] Light yellow soluble pigment. | Good growth. Aerial hyphae fair becoming abundant: White to taupe brown.[1] Reverse: Camel[1] to adobe brown.[1] Light yellow soluble pigment. |
| Potato slants | Excellent, smooth, moist, nodulated growth: Light fawn[1] to beige.[1] Trace of white aerial mycelium. No soluble pigment. | Profuse, moist, smooth nodulated growth: Light brown yellow[1] to beige[1] to cedar.[1] No soluble pigment. |
| Purple milk | No observable change | Slight white to pale yellow growth collar. Little significant pH change nor apparent peptonization in 14 days. |

[1] Color Harmony Manual, third edition, Container Corporation of America.

(5) MICROSCOPIC OBSERVATIONS

| Medium | Streptomyces aureofaciens | | | |
|---|---|---|---|---|
| | Strain S652 | | Strain A377 | |
| | Mycelium | Spores | Mycelium | Spores |
| Glycerol asparagine meat extract agar. | Flexuous, continuous branched. Diam. 0.5–1.5μ. | Spheroidal to ovoidal. Diam. 0.5–1.0μ. | Flexuous, continuous branched. Diam. 1.0–1.2μ. | Spheroidal to ovoidal. Diam. 1.2–1.5μ. |
| AP4 cornsteep agar | Flexuous continuous branched. Diam. 0.5–0.7μ. | Spheroidal to ovoidal. Diam. 0.5μ. | Flexuous, continuous branched. Diam. 0.8–1.0μ. | Spheroidal to ovoidal. Diam. 1.2–1.5μ. |
| Waksman's agar | Flexuous, continuous branched. Diam. 0.5–1.0μ. | Spheroidal to ovoidal. Diam. 0.5–1.0μ. | Flexuous, continuous branched. Diam. 0.5–1.0μ. | Spheroidal to ovoidal. Diam. 0.5–1.0μ. |

NOTE.—Mycelial and spore morphology of *Streptomyces aureofaciens* Strain S652 is apparently similar to that of the original Strain A377.

Viable cultures of mutant *S. aureofaciens* Strain S652 which produce the new compound have been deposited with the American Type Culture Collection in Washington, D.C., where this strain has been assigned ATCC Accession Number 13,189.

It is to be understood that the invention is not limited to the use of Strain S652 for the production of the novel compound herein as other strains of *S. aureofaciens* may also be used with varying degrees of effectiveness for the production of this compound as is indicated hereinabove. Thus we have used successfully strains designated as B740 (ATCC 12554), S730-6, S730-14, V11, V28, S609, and S77. To determine whether a selected colony will produce the new compound, it is necessary merely to cultivate a strain of *S. aureofaciens* in a fermentation flask and at the end of the fermentation period, filter the mash and examine the neutral filtrate spectrophotometrically for ultraviolet absorption at 278–280 mμ, characterizing the product in terms of its extinction coefficient value $$(E_{1\,cm}^{1\%})\ of\ 570$$

The conditions of the fermentation with the new strain of *S. aureofaciens* of this invention as well as the other strains referred to above are generally the same as those presently known for cultivating Streptomyces for the production of antibiotics or other products. Thus the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include calcium carbonate, ammonium sulfate, ammonium chloride, and the various trace elements such as manganese, cobalt, zinc, copper, iron and the like.

In general, the fermentation is carried out for about 48 to 200 hours and at temperatures ranging from about 20–40° C. The pH may range from 5.5–7.5.

The new compound may be isolated from the fermentation mash in any suitable manner. A preferred procedure involves an ion exchange separation in which the fermentation mash is filtered, and the filtrate is acidified to pH 1 to 2 with a suitable mineral acid such as hydrochloric acid, sulfuric acid, etc. The acidified aqueous filtrate is passed through an Amberlite IR–120 cation exchange resin column and the column is developed in the usual manner with an aqueous mineral acid, i.e., normal sulfuric acid. The eluted fraction is made alkaline by the addition of solid barium hydroxide with stirring. Barium sulfate precipitates and is filtered off while the pH of the aqueous solution is above pH 12. The filtrate is then neutralized with sulfuric acid and is concentrated in vacuo. Crystallization of the crude product occurs rapidly at room temperature (25°±5° C.). The product may then be purified in a standard manner by recrystallization from glacial acetic acid.

The invention will be described in greater detail in conjunction with the following specific examples.

Example 1

A typical medium used to grow the primary inoculum is prepared according to the following formulation:

| | | |
|---|---|---|
| Sucrose | grams | 30.0 |
| Ammonium sulfate | do | 2.0 |
| Calcium carbonate | do | 7.0 |
| Corn steep liquor | milliliters | 16.5 |

Water to 1,000 milliliters.

*Streptomyces aureofaciens*

| | Strain S652 | Strain A377 |
|---|---|---|
| Growth | Excellent, white to nude tan.[1] | Excellent. |
| Aerial mycelium | Abundant, white | Abundant, fawn.[1] |
| Sporulation | Abundant, fawn[1] to beaver.[1] | Profuse, uniform. |
| Soluble pigment | Tawny to light amber | Light yellow to amber. |
| Reverse | White to nude tan[1] | Light tan.[1] |

[1] Color Harmony Manual, third edition, Container Corporation of America.

Aliquots of this inoculum medium are placed in 8 inch test tubes which are sterilized at 120° C. and 15 pounds' pressure for 20 minutes. Spores of a strain of *S. aureofaciens* capable of producing 6-amino-5-hydroxy-1,3-cyclohexadiene-1-carboxylic acid, such as Strain S652, are washed from an agar slant with sterile distilled water to form a suspension containing approximately $60 \times 10^6$ spores per milliliter. A 0.33 milliliter portion of this suspension is added to each 8-inch test tube containing the sterilized medium. These inoculated tubes are incubated for 24 hours at 28° C. on a reciprocating shaker operating at 116 oscillations per minute.

*Example 2*

A typical synthetic medium which may be used in the fermentation process employing strains of *S. aureofaciens* to produce the new compound is prepared according to the following formulation:

| | | |
|---|---|---|
| Corn starch | grams | 55.0 |
| $CaCO_3$ | do | 9.0 |
| $(NH_4)_2SO_4$ | do | 5.0 |
| $NH_4Cl$ | do | 1.5 |
| $MgCl_2.6H_2O$ | do | 2.0 |
| KCl | milligrams | 1280 |
| $H_3PO_4$ | do | 400 |
| $FeSO_4.7H_2O$ | do | 60 |
| $MnSO_4.4H_2O$ | do | 50 |
| $ZnSO_4.7H_2O$ | do | 100 |
| $CoCl_2.6H_2O$ | do | 5 |

Water to 1,000 milliliters.

A 25 milliliter aliquot of this fermentation medium and 0.50 milliliters (2.0%) of lard oil are placed in a series of 250 milliliter Erlenmeyer flasks which are then sterilized at 120° C. and 15 pounds per square inch pressure for 20 minutes. The Erlenmeyer flasks are then inoculated with 1.0 milliliter of inoculum of *S. aureofaciens* S652 prepared according to the procedure of Example 1, and incubated at 27° C. for 96 hours on a rotary shaker operating at 180 revolutions per minute. The mash is assayed spectrophotometrically and is found to contain 3,200 micrograms per milliliter of 6-amino-5-hydroxy-1,3-cyclohexadiene-1-carboxylic acid.

*Example 3*

25 milliliter aliquots of the synthetic fermentation medium shown in Example 2 and 0.50 milliliters (2.0%) of lard oil are placed in a series of 250 milliliter Erlenmeyer flasks. These flasks are sterilized at 120° C. and 15 pounds per square inch pressure for 20 minutes. Following the sterilization procedure, 1.0 milliliter of inoculum of a strain of *S. aureofaciens* capable of producing 6-amino-5-hydroxy-1,3-cyclohexadiene-1-carboxylic acid, prepared according to the procedure of Example 1, is added to each flask and the flasks are incubated at 27° C. for 96 hours on a rotary shaker operating at 180 revolutions per minute. The mash is assayed spectrophotometrically and is found to contain 3,900 micrograms per milliliter of 6-amino-5-hydroxy-1,3-cyclohexadiene-1-carboxylic acid.

*Example 4*

A fermentation medium of the following formulation is prepared:

| | | |
|---|---|---|
| Corn starch | grams | 55.0 |
| Corn steep | do | 30.0 |
| Cotton seed meal | do | 2.0 |
| $CaCO_3$ | do | 7.0 |
| $(NH_4)_2SO_4$ | do | 5.0 |
| $NH_4Cl$ | do | 1.5 |
| $FeSO_4.7H_2O$ | milligrams | 40.0 |
| $MnSO_4.4H_2O$ | do | 50.0 |
| $ZnSO_4.7H_2O$ | do | 100.0 |
| $CoCl_2.6H_2O$ | do | 5.0 |

Water to 1,000 milliliters.

A 25 milliliter aliquot of this fermentation medium and 0.625 milliliter (2.5%) of lard oil are placed in a series of 250 milliliter Erlenmeyer flasks which are then sterilized at 120° C. and 15 pounds per square inch pressure for 20 minutes. The Erlenmeyer flasks are then inoculated with 1.0 milliliter of inoculum of *S. aureofaciens* Strain S652 prepared according to Example 1, and the flasks are incubated at 27° C. for 120 hours on a rotary shaker operating at 180 revolutions per minute. This mash is assayed spectrophotometrically and is found to contain 7350 micrograms per milliliter of 6-amino-5-hydroxy-1,3-cyclohexadiene-1-carboxylic acid.

*Example 5*

The procedure of the preceding example is repeated except that the temperature is maintained at 37° C. with a 6-amino-5-hydroxy-1,3-cyclohexadiene-1-carboxylic acid producing strain of *S. aureofaciens*. At the end of the fermentation, the mash is assayed spectrophotometrically and is found to contain 5050 micrograms per milliliter of 6-amino-5-hydroxy-1,3-cyclohexadiene-1-carboxylic acid.

*Example 6*

Ten liters of a fermentation mash prepared as in Example 4 is filtered and the pH of the filtrate is adjusted to pH 1.5 with concentrated hydrochloric acid. Spectrophotometric analysis of this filtrate shows 6.5 milligrams of 6-amino-5-hydroxy-1,3-cyclohexadiene-1-carboxylic acid per milliliter of filtrate. This acidified mash filtrate is put through a 3-inch diameter column containing 3 kilograms of Amberlite IR-120 (H-form) cation exchange resin. The resin column is then washed with 15 liters of distilled water. The column is eluted to extract the activity with 20 liters of normal sulfuric acid solution. The eluate is made alkaline (pH 12) by the addition of solid barium hydroxide with stirring. The resulting barium sulfate precipitate is filtered off. The filtrate is neutralized with sulfuric acid and the precipitated barium sulfate is again filtered off. The barium sulfate filter cake is washed with distilled water. The filtrates are combined and concentrated by vacuum distillation to about 100 milliliters. Crystallization of the tan-white solid occurs rapidly at room temperature (25°±5° C.) on seeding the concentrate (weight, 16.1 grams). The crude product is purified by repeated recrystallizations from glacial acetic acid. A pure crystalline product having a melting point of 190-191° C. with decomposition is obtained. The white crystalline solid is soluble in water and insoluble in chloroform and ether. The pKa value is 8.6. The ultraviolet spectrum indicates a strong single peak at 278 m$\mu$, $\epsilon=8,866$ in 1 molar acid solution. The optical rotation $[\alpha]_D^{25}$ (0.5% in 0.1 N HCl solution)$=+474°$; 0.5% in 0.1 N NaOH solution $=+599°$; and 2.0% in distilled water$=+456°$.

*Analysis.*—Calculated for $C_7H_9O_3N$: C, 54.20; H, 5.81; O, 31.00; N, 9.02. Found: C, 53.34; H, 6.43; O, 31.37; N, 8.86.

*Example 7*

A synthetic medium is prepared according to the formulation disclosed in Example 2. A 25 milliliter portion of this fermentation medium and 0.50 milliliter (2.0%) of lard oil are placed in a series of 250 milliliter Erlenmeyer flasks which are then sterilized at 120° C. and 15 pounds per square inch pressure for 20 minutes.

The Erlenmeyer flasks are then inoculated in a separate series of fermentations, with 1.0 milliliter of inoculum of a strain of *S. aureofaciens* prepared according to the procedure of Example 1, i.e., Strains B740 (ATCC 12554), S609, and S77, and incubated at 27° C. for 96 hours on a rotary shaker operating at 180 revolutions per minute. The mashes are assayed spectrophotometrically and are found to contain 6-amino-5-hydroxy-1,3- cyclohexadiene-1-carboxylic acid in the following amounts.

| | Mcg./ml. |
|---|---|
| Strain No. B740 (ATCC 12554) | 3,900 |
| Strain No. S609 | 1,800 |
| Strain No. S77 | 3,700 |

*Example 8*

A fermentation medium is prepared according to the formulation disclosed in Example 4. A 25 milliliter portion of this fermentation medium and 0.625 milliliter (2.5%) of lard oil are placed in a series of 250 milliliter Erlenmeyer flasks which are then sterilized at 120° C. and 15 pounds per square inch pressure for 20 minutes. The Erlenmeyer flasks are then inoculated, in a separate series of fermentations, with 1.0 milliliter of inoculum of a strain of S. aureofaciens prepared according to the procedure of Example 1, i.e. S652 (ATCC 13189), S730-6, S730-14, V11, V28 and S77, and the flasks are then incubated at 27° C. (except for Strain S77 which was incubated at 32° C.) for 96 hours on a rotary shaker operating at 180 revolutions per minute. The mashes are assayed spectrophotometrically and are found to contain 6-amino-5-hydroxy-1,3-cyclohexadiene-1-carboxylic acid in the following amounts:

| | Mcg./ml. |
|---|---|
| Strain No. S652 (ATCC 13189) | 10,500 |
| Strain No. S730-6 | 2,900 |
| Strain No. S730-14 | 4,400 |
| Strain No. V11 | 4,000 |
| Strain No. V28 | 3,900 |
| Strain No. S77 | 4,300 |

*Example 9*

6-amino-5-hydroxy-1,3-cyclohexadiene-1-carboxylic acid is quantitatively converted to anthranilic acid by heating (50–60° C.) with concentrated hydrochloric acid. The half-life of the reaction (t. ½) is about one hour. Anthranilic acid is identified by ultraviolet absorption spectrum, paper chromatographic evidence, and by identical melting point and mixed melting point values utilizing an anthranilic acid standard, and by comparison of its N-acetyl derivative with an authentic specimen.

*Example 10*

To 1.0 gram of 6-amino-5-hydroxy-1,3-cyclohexadiene-1-carboxylic acid is added 100 milliliters of water and 1.0 gram of dehydrogenation catalyst (10% palladium on carbon). The mixture is heated at reflux for 2 hours. The hot solution is filtered. On cooling, the filtrate yields a tannish-pink crystalline solid which is separated by filtration. The solid is recrystallized twice from hot methanol, using Darco G-60 as a decolorizing agent; and yielding 225 milligrams of recrystallized product with a melting point of 249°–250° C. (with decomposition) in agreement with the literature value for 2-amino-3-hydroxybenzoic acid. The ultraviolet absorption curves of 2-amino-3-hydroxybenzoic acid as given in the literature [J.A.C.S. 70, 1848 (1948)] and the product obtained by this example are identical.

This application is a continuation-in-part of our co-pending application, Serial No. 743,483, filed June 20, 1958, and now abandoned.

We claim:

1. The method of producing 6-amino-5-hydroxy-1,3-cyclohexadiene-1-carboxylic acid which comprises aerobically fermenting an aqueous nutrient medium at a temperature from about 20 to 40° C. with a 6-amino-5-hydroxy-1,3-cyclohexadiene-1-carboxylic acid-producing strain of S. aureofaciens, and continuing the fermentation until substantial quantities of 6-amino-5-hydroxy-1,3-cyclohexadiene-1-carboxylic acid are produced.

2. The method of producing 6-amino-5-hydroxy-1,3-cyclohexadiene-1-carboxylic acid which comprises aerobically fermenting an aqueous nutrient medium at a temperature from about 20 to 40° C. with a 6-amino-5-hydroxy-1,3-cyclohexadiene-1-carboxylic acid producing strain of S. aureofaciens, filtering the resulting fermented mash, acidifying the aqueous filtrate to pH 1–2, passing the aqueous filtrate through a cation exchanger, eluting the activity therefrom, and thereafter separating the activity from the eluate.

References Cited in the file of this patent

UNITED STATES PATENTS

| 2,871,167 | Szumski | Jan. 27, 1959 |
| 2,878,289 | McCormick et al. | Mar. 17, 1959 |